US008869958B2

(12) United States Patent
Gustafsson

(10) Patent No.: US 8,869,958 B2
(45) Date of Patent: Oct. 28, 2014

(54) HYDRAULIC ROTARY DAMPER FOR VEHICLE

(75) Inventor: Leif Gustafsson, Holmsjo (SE)

(73) Assignee: Ohlins Racing AB, Upplands Vasby (SE)

( * ) Notice: Subject to any disclaimer, the term of this patent is extended or adjusted under 35 U.S.C. 154(b) by 1192 days.

(21) Appl. No.: 12/664,043

(22) PCT Filed: Jun. 2, 2008

(86) PCT No.: PCT/SE2008/050642
§ 371 (c)(1),
(2), (4) Date: Jul. 16, 2010

(87) PCT Pub. No.: WO2008/153481
PCT Pub. Date: Dec. 18, 2008

(65) Prior Publication Data
US 2011/0056782 A1    Mar. 10, 2011

(30) Foreign Application Priority Data

Jun. 14, 2007 (SE) .................... 0701451-7
Sep. 4, 2007 (SE) .................... 0701971-4

(51) Int. Cl.
*F16F 9/14* (2006.01)
*B62K 21/08* (2006.01)
*F16F 9/516* (2006.01)

(52) U.S. Cl.
CPC ............. *F16K 9/145* (2013.01); *B62K 21/08* (2013.01); *F16F 9/516* (2013.01)
USPC .............................. 188/306; 188/310; 280/272

(58) Field of Classification Search
CPC ............ F16F 9/145; F16F 9/12; B62K 21/08; B60G 2202/22; B60G 2202/24; E05Y 2201/21
USPC .......... 188/290–296, 306–310, 317; 280/272; 180/441
See application file for complete search history.

(56) References Cited

U.S. PATENT DOCUMENTS 871,329 A * 11/1907 Dutrieux .................. 188/310
1,290,115 A * 1/1919 Derihon .................. 188/306
(Continued)

FOREIGN PATENT DOCUMENTS

JP     2003-175877     6/2003
JP     2005-112295     4/2005
WO    WO 2007/053944 A1   5/2007

OTHER PUBLICATIONS

International Search Report; dates Aug. 28, 2008; 3 pages.

(Continued)

*Primary Examiner* — Bradley King
*Assistant Examiner* — Stephen Bowes
(74) *Attorney, Agent, or Firm* — Knobbe Martens Olson & Bear, LLP

(57) ABSTRACT

The invention relates to a pressurized hydraulic rotation damper intended for use on a multiwheeled vehicle. The rotation damper comprises an outer housing and a lid that together enclose a damping-medium-filled main chamber, which chamber is pressurized by a pressure tank and divided by a delimiting blade/arm into two volumes. The damping medium flows between the two volumes in a duct delimited by at least a first valve and a second valve. These valves throttle the flow between the volumes when the blade moves in an inward and outward motion respectively, starting from an intermediate position where the two volumes are substantially equal in size, to an outer position, in which the blade bears against or is placed close to the inner face of the outer housing. The first valve controls the flow for outward motions and the second valve is used to control the flow for inward motions to either pass through the first valve, through the second valve or through both valves.

18 Claims, 4 Drawing Sheets

(56) References Cited

U.S. PATENT DOCUMENTS

| | | | | |
|---|---|---|---|---|
| 1,687,620 A | * | 10/1928 | Logan | 188/310 |
| 1,926,260 A | * | 9/1933 | Broulhiet | 188/306 |
| 2,070,799 A | * | 2/1937 | McKee | 188/317 |
| 2,314,493 A | * | 3/1943 | Frederick | 188/306 |
| 4,773,514 A | * | 9/1988 | Gustafsson | 188/306 |
| 5,404,961 A | | 4/1995 | Huber | |
| 6,742,794 B2 | * | 6/2004 | Bunya et al. | 280/272 |
| 6,802,519 B2 | * | 10/2004 | Morgan et al. | 280/272 |
| 6,824,153 B2 | * | 11/2004 | Hanawa et al. | 280/272 |
| 7,021,433 B2 | * | 4/2006 | Yamada et al. | 188/294 |
| 8,051,962 B2 | * | 11/2011 | Hara | 188/306 |
| 2003/0234508 A1 | | 12/2003 | Hanawa et al. | |
| 2004/0046351 A1 | * | 3/2004 | Morgan et al. | 280/272 |
| 2004/0239069 A1 | * | 12/2004 | Yamada et al. | 280/272 |
| 2005/0274582 A1 | | 12/2005 | Tomonaga | |
| 2006/0220340 A1 | * | 10/2006 | Seki et al. | 280/272 |

OTHER PUBLICATIONS

Translation of Office Action Re: JP 2010-512120, Mailed Oct. 2, 2012.

Extended European Search Report for Application No. 08779324.6, dated Apr. 16, 2014, in 8 pages.

* cited by examiner

HYDRAULIC ROTARY DAMPER FOR VEHICLE

CROSS-REFERENCE TO RELATED APPLICATIONS

This application is a U.S. National Phase of International Application No. PCT/SE2008/050642, filed Jun. 2, 2008, which claims priority to Swedish Patent Application No. 0701451-7, which was filed on Jun. 14, 2007 and Swedish Patent Application No. 0701971-4, which was filed on Sep. 4, 2007.

BACKGROUND OF THE INVENTION

1. Field of the Invention

The invention relates to a hydraulic rotary/rotation damper with built-in pressure equalization that is intended for use on a multiwheeled vehicle or on a vehicle with runners, such as a motor cycle, an ATV or a snow scooter. The damper comprises an outer housing in which an oil chamber is configured. The oil chamber is divided into two chambers by a delimiting arm/blade that is rotatable about a first end. At the first end of the arm is a lever that rotates with the delimiting arm relative to the outer housing. The oil flow between the two damping chambers differs depending upon whether the delimiting arm is rotating from a central position outward toward an outer position or from the outer position and inward toward the central position. In addition, the oil flow between the two damping chambers is adjusted with a valve through which the flow varies with the flow velocity.

2. Description of the Related Art

A rotary damper can be fitted between the rotary handlebar of a vehicle and its fixed frame or chassis in order to damp shocks and violent motions that are transmitted from the front wheel(s) to the handlebar, i.e. the damper is used as a steering damper. Where the steering damper is used on a motorcycle, the steering damper can solve wobbling, which can occur in a motorcycle at high speeds. Wobbling means that the front wheel of the motorcycle begins to oscillate about the steering axle with increasing amplitude. Where the steering damper is used on a four-wheeled all-terrain vehicle, a so-called ATV, the steering damper primarily is intended to damp out violent steering motions that are caused by, for example, an asymmetric load exerted upon the wheels. This is the same for snow scooter applications. A rotation damper can also be used for other vehicle-specific applications, for example, to damp a motion between a wheel or runner and a chassis.

In a steering damper in the form of a hydraulic rotation damper, it has proven difficult to adjust the damping character in the steering damper when the driver executes a steering motion or when the handlebar moves back to the central position.

In the prior art, see, for example, published patent application US 2004/0239069, a steering damper is described in which the two damping chambers are connected by a duct containing an adjustable high-speed valve. Also connected to the duct is a pressurizing tank. Because only one valve is used and because the duct extends between the outer parts of the two damping chambers, the damping character is the same during both outward movement and inward movement of the blade.

In U.S. Pat. No. 6,802,519, a steering damper is described in which the damping chambers are connected to three different ducts depending upon whether the blade moves in an outward motion or an inward motion from the central position. When the blade moves in the outward motion, the flow between the damping chambers runs in a first duct or a second duct, whose areas are adjustable by a respective valve. When the blade moves with the inward motion, the flow between the chambers runs in a third duct that is fully open and allows free flow such that the inward motion is totally undamped. In a neutral position, i.e., when the blade is in the central position, the connection between the chambers is closed off. The drawback with this solution is, firstly, that the damping during the inward return motion is totally undamped and non-adjustable and, secondly, that the damper has no pressurization. A totally undamped return motion can produce undesirable vibrations in the system, which can result in inconsistent behavior and cavitation.

A further problem that has manifested itself in a steering damper in the form of a hydraulic rotation damper involves adjusting the flow between the damping chambers that are delimited by the rotary arm so that the damping force is adapted to different flow velocities, i.e. motions of different magnitude between the handlebar and the frame.

In the prior art, see, for example, U.S. Pat. No. 1,873,100, the damping force is adapted to different flow velocities by the use of a throttle valve, a so-called bleed valve, for example, which is placed in the damping duct between the chambers. Throttle valve means a fixedly adjustable restriction that increases the damping quadratically with the flow velocity.

In one refinement of such a steering damper, see U.S. Pat. No. 4,773,514, a traditional throttle valve has been supplemented by a further, narrower, fixed throttle valve, i.e., a so-called high-speed valve. At a predetermined high flow velocity, the narrower valve takes over the full oil flow and, thereafter, the damping follows the curve of the narrower restriction. However, this solution, too, has limitations. The narrower valve often displays a tendency to take over the full oil flow too long, resulting in an inconsistent damping character. Moreover, it is difficult to ensure consistent damping character from one damper to the next because adjustment of the valve is made before the damper is fitted. The high-speed valve is flowed through, moreover, from different directions in the event of right or left steering deflections, the effect being that the forces can only with difficulty be made equal in both directions. Because of this two-way flow through the valve, it also is a problem to adjust the return travel from the respective outer end position and to easily pressurize the steering damper such that the damper is insensitive to temperature changes.

Published patent application US 2004/0239069 describes that the steering damper electrically adjusts the damping characteristics on the basis of the steering speed. The throttling magnitude of a valve is adjusted with a linear motor so that the flow through the valve is adapted to the speed and steering speed of the vehicle. The damping characteristics are altered so that at a low speed there is a low damping force and at a high speed there is a high damping force. In addition, the damping is adjusted so that, at a speed-dependent steering speed, the slope of the damping curve is altered such that the damping force increases more slowly at increased steering speed. This slower damping force increase prevents the steering from becoming too hard at certain speeds. This damping character is suitable for road-driven motor cycles. For a versatile damper that is usable in off-road driving, the damper should be able to rapidly absorb powerful shocks caused by the ground surface and also should be able to rapidly return to the original position. A slow damping force increase therefore is not desirable. Instead, a slow damping force increase prevents these characteristics. Moreover, controlling of the damper calls for electrically controlled components, which means that the adjustment becomes complicated and prone to breakdowns and power failures.

In addition, there are also valves commonly known within hydraulics, intended for use as flow limiters, in which the restriction increases with increased flow. These valves have not previously been used, however, to adjust the damping character of a steering damper, but rather are used, for example, to adjust the flow of hydraulic medium in differentials.

SUMMARY OF THE INVENTION

The object of the present invention is to solve the problem of adjusting outward and inward damping character in a rotation damper so that the damper can easily be adapted to different driving situations and drivers.

A further object of the invention is to solve the problem of adjusting the flow between the two damping chambers of a steering damper, in the form of a rotation damper, so that the damping force is rapidly adapted to different flow velocities. With the invention it is uncomplicated to define and adjust from outside a maximum restriction at low volume flows or flow velocities, as well as constructively to determine a minimum restriction at high flow velocities. It is also possible to adjust the instantaneous restriction at a given flow velocity.

The invention also aims to solve these problems so that the damper acquires a consistent damping character both between each individual specimen (i.e., improved manufacturing tolerances) and between the two damping directions. The present invention must also be insensitive to temperature changes and the end product must not be too overcomplicated.

The invention relates to a pressurized hydraulic rotation damper intended for use on a multiwheeled, preferably two, three or four-wheeled vehicle, or a vehicle with runners, such as a snow scooter. The rotation damper comprises an outer housing and a lid, which enclose a damping-medium-filled main chamber divided by a delimiting blade/arm into two volumes. The damping medium flows between the two volumes in a damping medium duct delimited by at least a first valve and a second valve. These valves throttle the flow between the two volumes when the blade moves in an inward motion or an outward motion, starting from an intermediate position in which the two volumes are substantially equal in size, to an outer position, in which the blade bears against or is placed close to the inner face of the outer housing, so that one volume is maximized while the other one is minimized. The first valve controls the flow for outward motions and the second valve controls the flow for inward motions to either pass through the first valve, through the second valve or through both the first valve and the second valve. The damping character for outward motion and inward motion therefore can be adjusted separately from each other, or can be chosen to be mutually dependent.

In one refinement of the invention, the first valve is connected to the main chamber via a duct that emerges in the inner volume of the outer housing, i.e. the main chamber, at a position that coincides with the central position of the blade. Preferably, the volumes are connected via a substantially oblong recess or duct that is disposed at the mouth of the duct when the blade is in its intermediate position.

When the blade is in its intermediate position, an intermediate volume pressurized by the pressure tank is connected to the two volumes via a duct or the like so that the pressure prevailing in the pressure tank is also in force in the two volumes. This solution reduces the risk of cavitation while also providing a consistent damping character in both directions.

The invention also relates to a hydraulic rotation damper in which the damping medium flows between the two working volumes of the damper in a damping medium duct divided by at least one flow-throttling one-way valve that adjusts the flow between the working volumes depending upon the rotational speed of the blade. The valve comprises a valve housing and a movable cone disposed therein, between which a variable restriction having a throttle point is disposed. The cone comprises a flow constriction which creates an initial pressure loss between upper and lower cone chambers disposed in the cone, a pressure loss which shifts the cone in relation to the valve housing so that the throttle point becomes narrower as the flow velocity increases. At low flow velocities, the throttle point is therefore a certain predetermined size and a certain flow can flow through it, so that the damper acquires a certain damping character, i.e. the flow curve acquires a certain slope. When the flow velocity increases, the possible flow through the restriction decreases and the slope of the flow curve increases.

The variable restriction between the valve housing and the cone is enabled by the interaction of a second recess or cutout recessed in the valve housing and a third recess cut out of the outer face of the valve cone. The second recess or cutout recessed in the valve housing is connected with first holes to the second recess, which in turn is connected to the inner upper chamber of the cone via second holes. This design provides an easily adjustable restriction, which connects the damping medium duct at the inlet of the valve to the damping medium duct at the outlet of the valve via the upper chamber inside the cone, the flow constriction hole and the lower chamber inside the cone.

The low-speed region of the valve is determined by the size of the adjustable restriction initially, i.e. how the second and the third recesses are placed in relation to each other precisely at the start of the outward motion of the blade. The position of the second and third recesses in relation to each other is determined by the initial pressure loss over the cone in combination with spring forces created by a spring disposed between the cone and the valve housing. When the initial pressure loss is zero, i.e. when the same pressure prevails in the upper and lower chambers of the cone, the placement of the second and third recesses in relation to each other is determined by the position of an adjusting wheel disposed on top of the valve. Rotation of the adjusting wheel shifts the cone in relation to the valve housing.

Preferably, the flow constriction has the form of a hole disposed in a wall dividing the interior of the cone into the upper and the lower chamber. In one embodiment of the invention, the size of the flow constriction, i.e. the value of the initial pressure loss, is adjustable from outside, preferably by adjusting the placement of a displaceable conical pin in the center of the constriction.

BRIEF DESCRIPTION OF THE DRAWINGS

These and other features, aspects and advantages of the present invention now will be described with reference to the following figures.

DETAILED DESCRIPTION OF THE PREFERRED EMBODIMENT

Figure 1A:
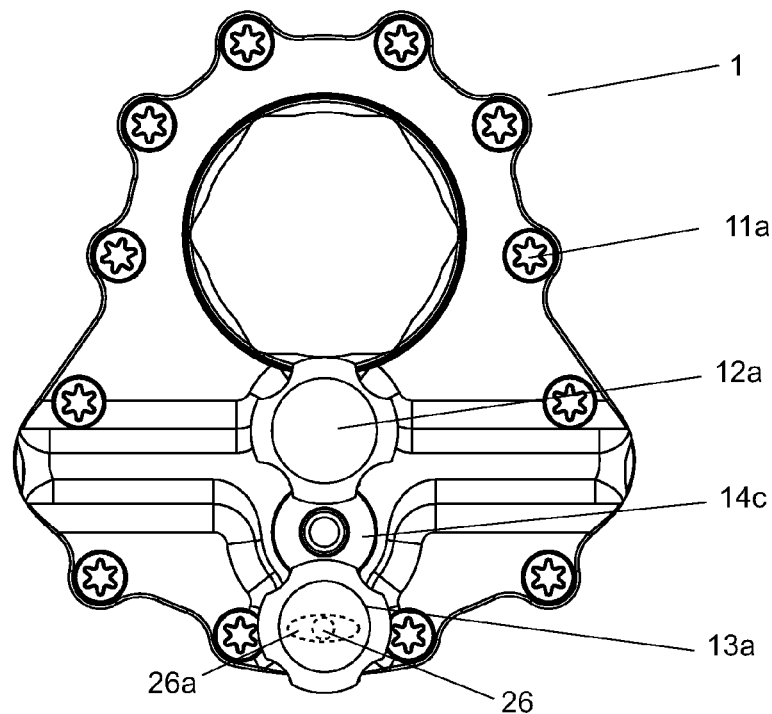
FIG. 1a shows a top view of the steering damper according to the invention.

FIG. 1a shows a top view of the hydraulic rotation damper 1 having a lower housing 10 and a lid 11, which enclose a damping-medium-filled main chamber 10a. The rotation damper 1 in this case also can be referred to as a blade or wing damper. The lid 11 is secured by twelve screws 11a, but the number of screws can be varied. A first adjusting wheel 12a regulates the damping force for a first rotational motion of the housing and lid of the rotation damper, and a second adjusting wheel 13a regulates the damping for a second rotational motion of the housing and lid, wherein the second motion is opposite to the first motion. Between these adjusting wheels 12a, 13a can be seen a cover 14c to a tank 14 (more closely shown in FIG. 2a).

Figure 1B:
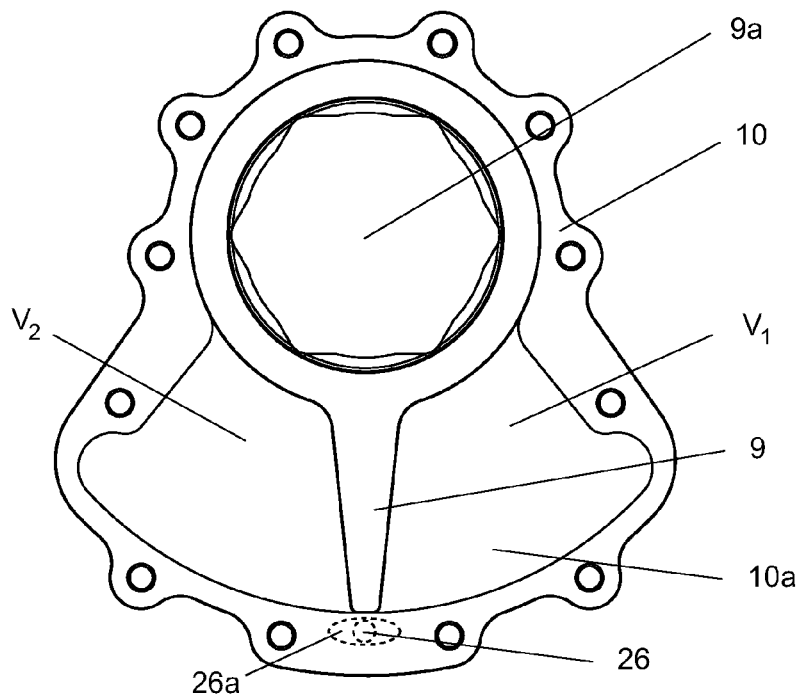
FIG. 1b shows the steering damper with lid removed.

FIG. 1b shows the damper with the lid 11 removed. An arm/a blade 9 in the housing 10 divides the main chamber 10a of the damper into a first damping chamber having a first volume V1 and a second damping chamber having a second volume V2. In the center of the mounting of the blade/arm 9 in the lower housing 10 is a hexagonal cavity 9a in which a lever is disposed. The lever is fixed at its other end in a non-rotary vehicle chassis (not shown) and causes the blade 9 to rotate in relation to the housing 10. The housing 10 is fixed in and rotates with the handlebar and steering column of the vehicle about a rotation axis (not shown) or about some other part of the vehicle whose parts need to be damped relative to one another (not shown). Where the damper is used as a steering damper and the vehicle is driven straight ahead without external disturbances, the blade is in the position shown in the figure, i.e. in a central position in which the first and second volumes V1, V2 are substantially equal in size. The contours of a first duct 26 having a cut-out first opening/recess 26a, described in greater detail below, are also those shown in FIGS. 1a and 1b. A duct incorporated in the housing 10 or the lid 11 is also possible, but is not shown.

Figure 2A:
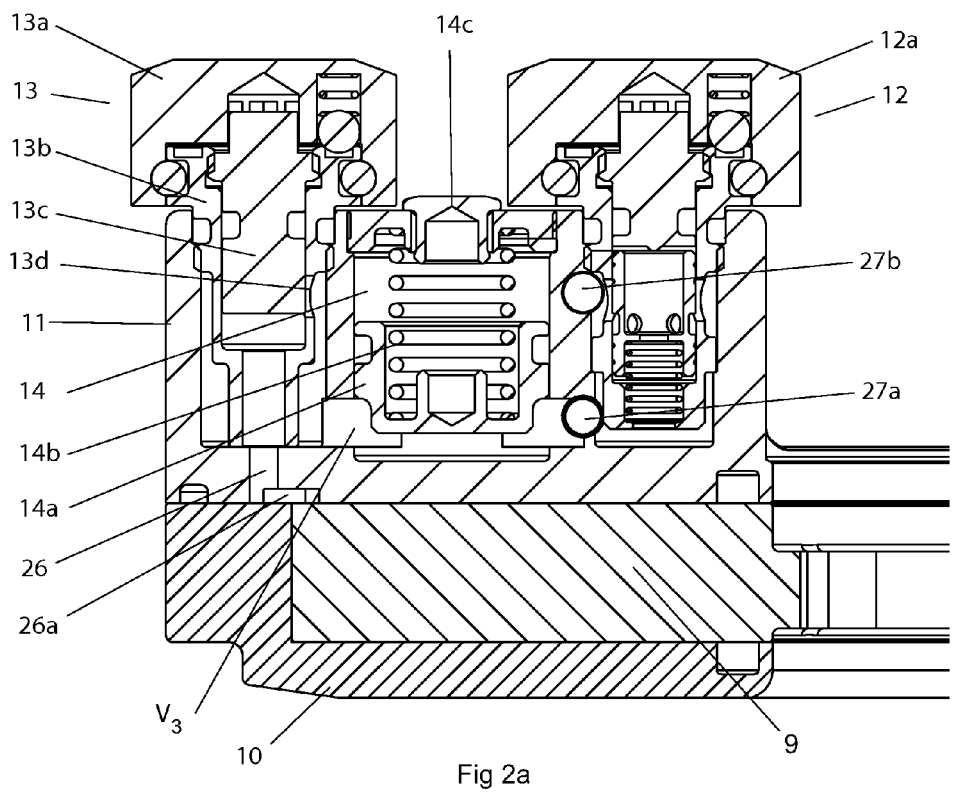
FIG. 2a shows a vertical section through the central part of the damper.

FIG. 2a shows a vertical section through the central part of the damper, in which the inner parts of the damper delimited by the lower housing 10 and the lid 11 are shown in greater detail.

The first adjusting wheel 12a adjusts a damping medium flow through a first valve 12 intended to control the flow between the volumes V1, V2 of the first and second damping chambers when the blade 9 moves out from the central position of the blade toward an outer position closer to the inner face of the housing, i.e. during outward motion. The damping medium is preferably a hydraulic oil, possibly with various additives. The second adjusting wheel 13a adjusts the return flow through a second valve 13 when the blade 9 moves back from the outer position toward the central position, i.e. during return motion. Between the valve for outward motion 12 and the valve for return motion 13, a pressurized tank 14 with a piston 14a, a spring 14b and a cover 14c, is disposed in an intermediate volume V3. The tank 14 can be used to compensate for the change in volume of the damping medium due to a change in temperature of the medium. If heating occurs, the tank 14 can take up the expanding oil volume by movement of the piston 14a that increases the intermediate volume V3. Upon subsequent cooling of the working medium of the damper, the spring 14b, via the piston 14a, returns the medium to the first and/or the second volume V1, V2, so that cavitation is avoided in the working chambers. The function of the spring also in certain cases can be replaced or supplemented by a medium more compressible than oil, for example air. In this case, an intake air valve 14d is coupled to the tank 14 via the cover 14c.

With reference now to FIGS. 4a-4d, a second duct, comprising a first part 25b and a second part 27b, conducts oil to the inlet of the first valve 12, which first valve 12 is designed for outward motion, and a third duct, comprising a first part 25a and a second part 27a, conducts the oil from said valve 12. There the third duct 25a, 27a is also connected to the pressurized intermediate volume V3.

Leading to the second valve 13, designed for return motion, is the first duct 26, which extends from the inner volume of the outer housing 10 at a position which coincides with the central position of the blade 9. As shown in FIGS. 1a and 1b, a first recess 26a, disposed at the mouth of the first duct 26 in the main chamber 10a of the housing 10, connects the volumes V1 and V2 when the blade is in its central position. The first recess can also have the form of an opening, for example a duct having an inlet/outlet in the first volume V1 and the second volume V2. Both the first duct 26 and the first opening/recess 26a are preferably disposed in the lid 11, but can also be disposed in the housing.

During small motions of the blade around the central position, i.e. during small steering deflections of the handlebar of the vehicle, the two volumes V1 and V2 remain connected and the steering motion is undamped. The magnitude of this undamped central position is determined by the extent of the first recess 26a in the direction transverse to the blade 9. The connection between the volumes V1, V2 via the first recess 26a also ensures that when the blade 9 is in its intermediate position, the intermediate volume V3 pressurized by the pressure tank 14 is connected to the two volumes V1, V2, so that substantially the same pressure as in the pressure tank 14 is in force in the two volumes V1, V2. The behavior of the damper is then consistent in both damping directions.

The second valve 13 can be adjusted from a fully open to a fully closed position by the second adjusting wheel 13a. The valve consists of the adjusting wheel 13a, as well as a first, hollow valve part 13b and a second, movable valve part 13c. The first valve part 13b is threaded into the housing and inside it the second valve part 13c is disposed and is displaceable by rotation of the adjusting wheel 13a. The opening position of the valve is determined by the placement of the second valve part 13c in relation to a hole 13d disposed in the first valve part 13b. The hole 13d connects the first duct 26 to the intermediate volume V3, in which the pressurizing tank 14 is disposed.

Figure 2B:
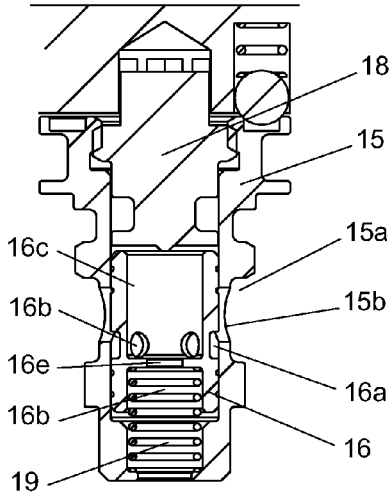
FIG. 2b shows a first embodiment of the construction of the first valve 12.

The construction of the first valve 12 is shown in greater detail in FIG. 2b. A valve housing 15 disposed around the valve 12 has a second recess or cutout 15a. This second recess 15a is connected by a hole 15b to a third recess 16a cut out of the outer face of a valve cone 16. Other holes 16b are arranged from the third recess 16a to the interior of the cone. As a result of interaction between the second and third recesses 15a, 16a and the holes 16*b*, a variable restriction is created having a throttle point created in the space between the valve housing 15 and the cone 16. The interior of the cone is divided into two separate chambers 16*c*, 16*d* by a wall with an opening 16*e* disposed therein having a certain limited flow area, which acts as a flow constriction between the cone chambers 16*c*, 16*d*. The cone 16 can move in the valve housing 15 counter to the action of a spring 19 resting on a bottom face of the valve housing 15 in one of the cone chambers 16*d*.

The oil flow comes from one of the volumes V1, V2 into the second duct 25*b*, 27*b* and flows via holes 15*b*, 16*b* in the valve housing 15 into the cone 16 and onward via the constriction 16*e* of the cone so as finally to flow out, via the pressurized intermediate volume V3, through the third duct 25*a*, 27*a* and a fourth duct 25*c*, 27*c* to the second of the volumes V2/V1. In the constriction 16*e* of the cone, a pressure loss occurs when the oil passes through. This pressure loss transports the cone 16 downward in the figure, whereby the restoring spring 19 is compressed. The motion also means that the free opening of the holes 15*b* toward the third recess 16*a* diminishes, that is to say the restriction between the valve housing 15 and the cone 16 becomes greater. The oil flow through the valve 13 thus suffers an increasing pressure loss, since the clamping medium is forced through a smaller opening. The initial opening of the holes 15*b* toward the third recess 16*a* can be adjusted by virtue of the upper stop position 18 of the cone 16 being adjustable in the movement direction of the cone with the aid of the wheel 12*a*.

Figure 2C:
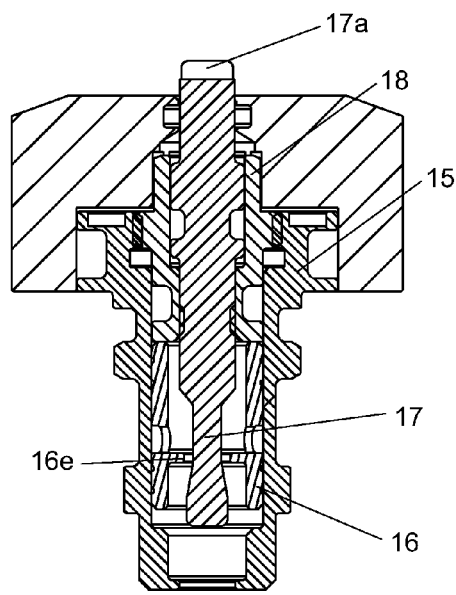
FIG. 2c shows an alternative construction of the first valve 12.

An alternative construction of the valve 12 is shown in FIG. 2*c*. The valve housing 15 is identical with FIG. 2*a*, but the inner constriction 16*e* of the cone 16 has been made adjustable from the outside by the placement of a displaceable conical pin 17 in its center. When the cone 16 is drawn along by the pressure loss generated by the constriction 16*e*, the size of the latter also diminishes and, with the volume flow, a more rapid increase in pressure loss is obtained. The adjustability of the displaceable conical pin 17 is achieved by it being twisted relative to the adjustable stop 18 with the aid of a screwdriver slot 17*a*, and a thread 17*b*. Thus, the conical pin 17 is adjustable in the movement direction of the cone 16.

Figure 3:
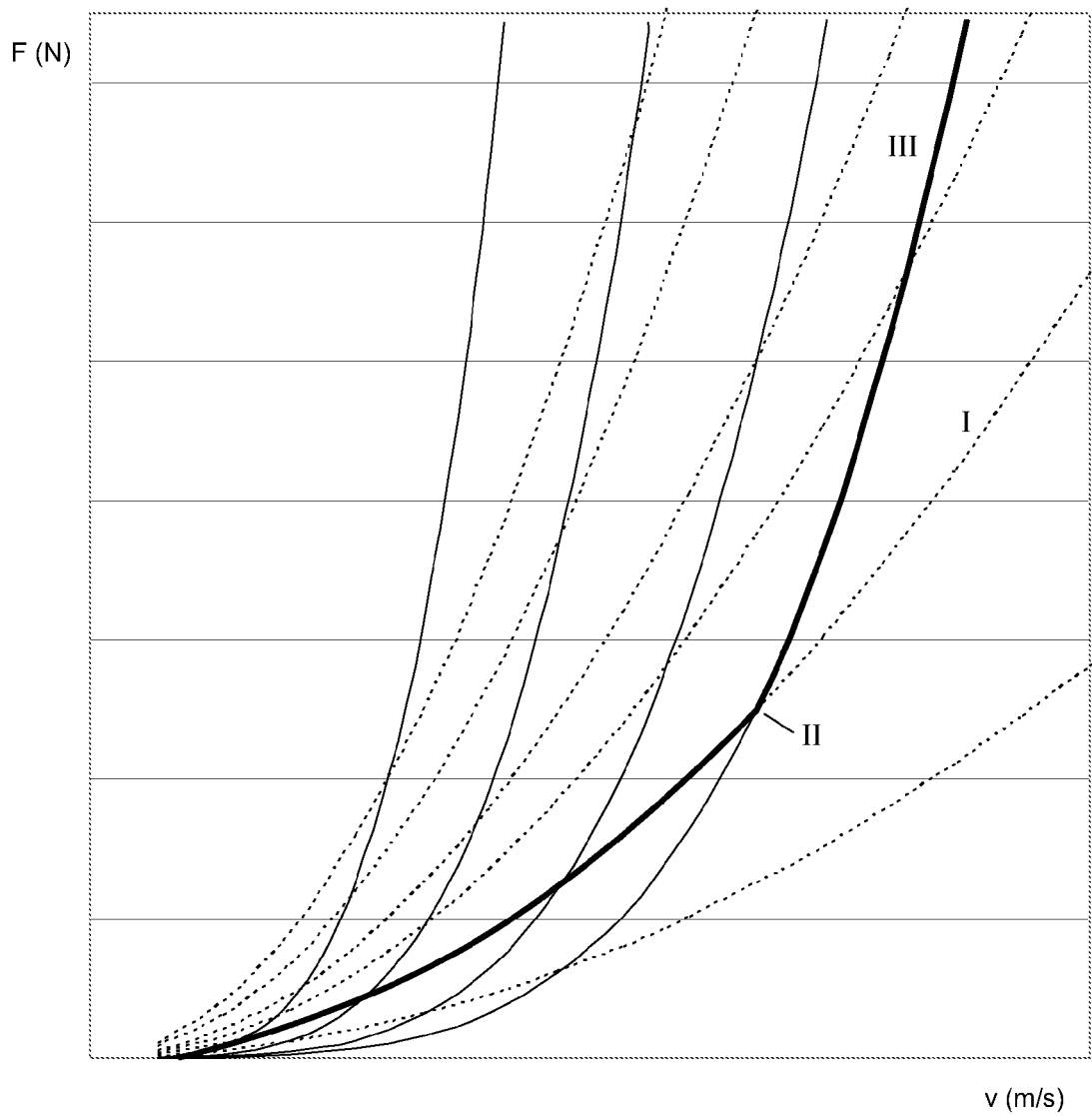
FIG. 3 illustrates with damping curves the function of the first valve 12.

The function of the valve 12 is also illustrated by the damping curves shown in FIG. 3. The passage between the valve housing 15 and the cone 16, which passage can be regulated with the wheel 12*a*, initially produces a pressure loss over the valve, which increases by the square of the volume flow in a manner very familiar to a hydraulics engineer. In FIG. 3, a number of such curves for restrictions of different magnitudes are illustrated with a dashed group of curves. This function is symbolized in FIGS. 4*a*, 4*b*, 4*c* and 4*d* with 12". If the flow increases, the pressure loss which occurs through the inner flow constriction 16*e* of the cone 16 draws the cone along with it, so that the initial passage is further constricted. A faster pressure loss increase than the known quadratic relationship is then obtained over the valve. Examples of rapidly increasing pressure loss curves of this type have been illustrated in FIG. 3 with a solid group of curves. This second function of the valve 12 is symbolized in FIGS. 4*a*, 4*b*, 4*c* and 4*d* with 12'.

An envisaged control process for the valve 12 therefore is that, at low flows, the pressure increases with increasing flow, for example according to the dashed curve I in FIG. 3. At a certain flow II, the pressure difference over the delimiting wall of the cone becomes sufficiently large that the force from the spring 19 is surmounted and the cone is shifted downward counter to the action of the spring 19, so that the flow passage diminishes further and continued pressure increase follows the solid curve III.

Figure 4A:
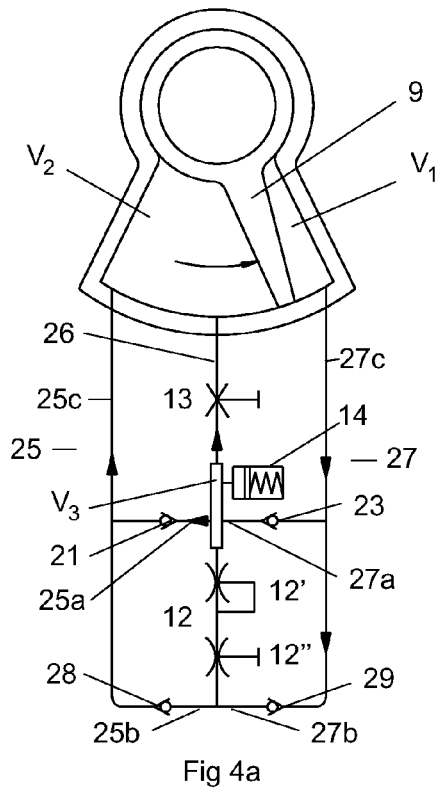
FIG. 4a shows a simplified sketch of the flow during outward motion, with the second valve 13 open.

FIG. 4*a* shows a simplified sketch of the flow during outward motion with the second valve 13 open. The blade 9 has passed through the central position and is moving toward the end position. The oil has only the option, via first parts of the fourth and second ducts 27*c*, 27*b*, of flowing through the valve 12, since a first nonreturn valve 23 is blocking the passage through the first part 27*a* of the third duct direct to the valve 13. A second nonreturn valve 21 is placed in a second part 25*a* of the third duct, in which the second part 25*a* extends from the intermediate volume V3, via a second part 25*c* of the fourth duct, to the second damping chamber V2. A third nonreturn valve 28 and a fourth nonreturn valve 29 are placed in the first respective second parts 25*b*, 27*b* of the second duct to prevent damping medium from flowing through the valve 12 in the direction from the intermediate volume V3 to the respective damping chamber V1/V2. The placement of the tank 14 and of its intermediate volume V3 is such that, due to the placement of the nonreturn valves 21 and 23 in the third duct 25*a*, 27*a*, it is never exposed to the regulating pressure produced by the valve 12. The two different functions of the valve 12 are symbolized with 12' and 12". These different functions are series-connected and the function which has the highest restriction at a certain flow dominates.

Figure 4B:
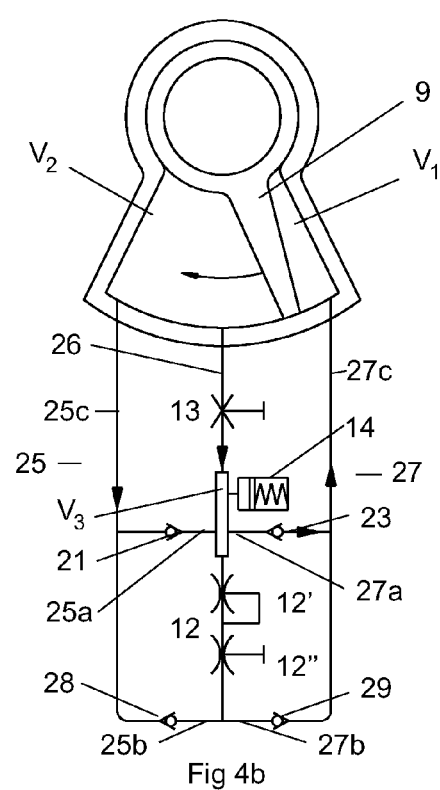
FIG. 4b shows the flow during inward motion from an outer and turning position toward the central position, with the second valve 13 open.

In FIG. 4*b*, the second valve 13 remains open. The blade is moving in an inward motion from its outer and turning position toward the central position.

The oil can now flow via the first duct 26 without resistance through the open valve 13 through the open direction in the nonreturn valve 23 and, via the first parts 27*a*, 27*c* of the third and fourth ducts, enter into the main chamber 10*a* of the housing 10 and the first volume V1. No oil passes through the valve 12. The return motion is thus undamped.

Figure 4C:
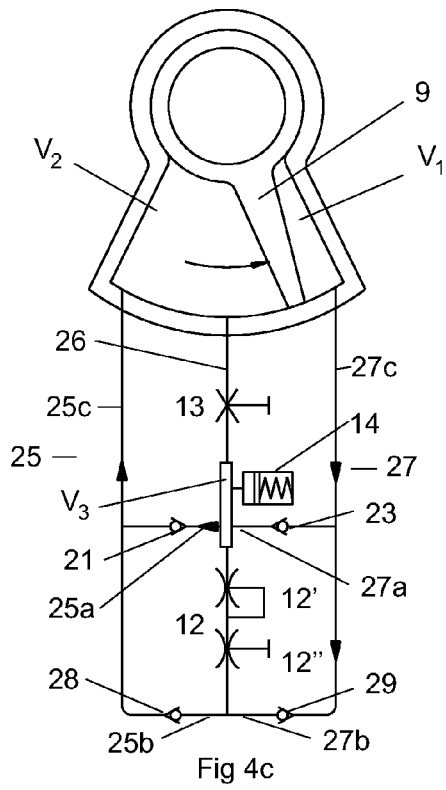
FIG. 4c shows the flow during outward motion, with closed second valve 13.

FIG. 4*c* shows the flow during outward motion with the second valve 13 in a closed position. The flow is similar to that in FIG. 4*a*, i.e. all flow passes through the valve 12.

Figure 4D:
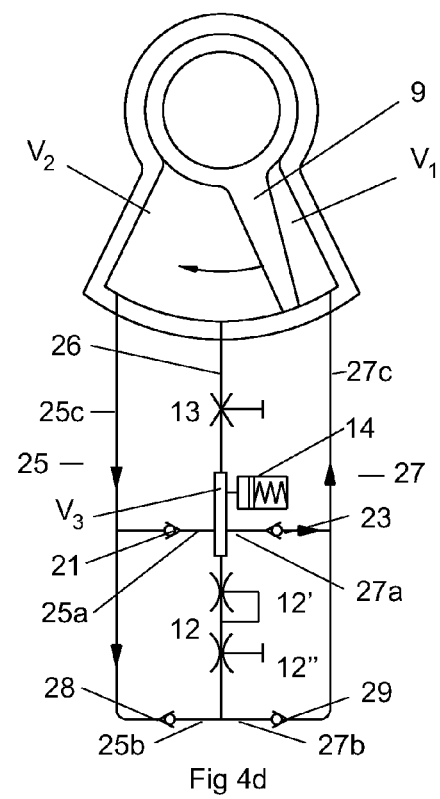
FIG. 4d shows the flow during inward motion, with closed second valve 13.

FIG. 4*d* shows the flow during inward motion with the second valve 13 in a closed position. The oil thus is prevented from flowing through the first duct 26. All flow must thus pass through the second part 25*c* of the fourth duct, in addition to which the nonreturn valve 21 does not allow any flow from the second part 25*c* of the fourth duct through the first part 27*a* of the third duct. All flow will therefore pass through the valve 12. Thus, with the return valve 13 closed, the same damping is obtained during inward motion as during outward motion.

The return valve 13 can assume all values between fully open and fully closed and, depending on the degree of opening, the damping medium then flows either through just the first valve 12, through just the second valve 13, or through both of the two valves 12, 13. Thus, the return flow can be adjusted and adapted to the driving situation and driver behavior.

Naturally, the valve works in the same way in respect of both movement directions.

The invention is not limited to the embodiments shown as examples above but can be modified within the scope of the following patent claims and the inventive concept.

The invention claimed is:

1. A hydraulic rotation damper intended for use on a vehicle, the rotation damper comprising an outer housing and a lid, the outer housing and the lid enclosing a damping-medium-filled main chamber that is pressurized by a pressure tank and that is divided by a delimiting blade/arm into two volumes, in which the damping medium flows between the two volumes in a damping medium duct delimited by at least a first valve and a second valve, the first valve and the second valve throttle the flow between the volumes when the blade moves in an inward motion and an outward motion to or from an intermediate position, in which the two volumes are substantially equal in size, from or to an outer position, in which the blade bears against or is placed close to an inner face of the outer housing, the first valve controlling the flow for outward motions and the second valve controlling the flow for inward motions to either pass through the first valve, through the second valve or through both valves, the second valve being connected to the main chamber via a first duct such that, when the second valve is partially open, the damping medium flows between the volumes through the first valve during outward motions, and during inward motion the damping medium flows only through the second valve or through both valves, the first duct emerging in an inner volume of the outer housing at a position that coincides with the intermediate position of the blade.

2. The hydraulic rotation damper as claimed in claim 1, wherein the volumes are connected when the blade is in its intermediate position such that a connection is created by an opening of the first duct that extends between the volumes.

3. The hydraulic rotation damper as claimed in claim 2, wherein the opening is a substantially oblong first recess disposed at a mouth of the first duct.

4. The hydraulic rotation damper as claimed in claim 1, wherein an intermediate volume pressurized by the pressure tank is connected to the two volumes by ducts so that a pressure prevailing in the pressure tank is also in force in the two volumes.

5. The hydraulic rotation damper as claimed in claim 1, wherein when the second valve is fully closed, the damping medium flows between the volumes through the first valve during both outward and inward motions.

6. The hydraulic rotation damper as claimed in claim 1, wherein when the second valve is fully open, the damping medium flows between the volumes through the first valve during outward motions, and during inward motion the damping medium flows undamped between the volumes.

7. A hydraulic rotation damper substantially intended for use as a steering damper on a vehicle, the rotation damper comprising an outer housing and a lid, the outer housing and the lid enclosing a damping-medium-filled main chamber divided by a delimiting blade/arm rotating in the damping medium into a first working volume and a second working volume, the damping medium capable of flowing between the two working volumes in a damping medium duct that is divided by at least a first valve, which adjusts the flow between the working volumes dependent upon a rotational speed of the blade, the flow between the working volumes being substantially adjusted via a first one-way valve comprising a valve housing and a movable cone disposed therein, a variable restriction having a throttle point being disposed between the valve housing and the movable cone, the cone comprising a flow constriction that creates an initial pressure loss between upper and lower cone chambers that are disposed in the cone and that shifts the cone in relation to the valve housing so that the throttle point becomes narrower as the flow velocity increases, wherein the variable restriction between the valve housing and the cone is created by the interaction of a recess formed in the valve housing and a recess formed in the outer face of the valve cone and the recess formed in the valve housing is connected with first holes to the recess formed in the outer face of the valve cone, which in turn is connected to an interior of the cone via second holes.

8. The hydraulic rotation damper as claimed in claim 7, wherein the position of the recess formed in the valve housing and the recess formed in the outer face of the valve cone in relation to each other is determined by an initial pressure loss over the cone in combination with spring forces created by a spring disposed between the cone and the valve housing.

9. The hydraulic rotation damper as claimed in claim 8, wherein when the pressure loss over the cone is zero, the position of the recess formed in the valve housing and the recess formed in the outer face of the valve cone in relation to each other is determined by a position of an adjusting wheel.

10. The hydraulic rotation damper as claimed in claim 9, wherein rotation of the adjusting wheel shifts the cone in relation to the valve housing.

11. The hydraulic rotation damper as claimed in claim 7 wherein the flow constriction has the form of an opening in the cone, the opening in the cone having a certain flow area.

12. The hydraulic rotation damper as claimed in claim 11, wherein the opening in the cone is disposed in a wall dividing an interior of the cone into two.

13. The hydraulic rotation damper as claimed in claim 7, wherein the first working volume and the second working volume are connected by a recess.

14. A hydraulic rotation damper substantially intended for use as a steering damper on a vehicle, the rotation damper comprising an outer housing and a lid, the outer housing and the lid enclosing a damping-medium-filled main chamber divided by a delimiting blade/arm rotating in the damping medium into a first working volume and a second working volume, the damping medium capable of flowing between the two working volumes in a damping medium duct that is divided by at least a first valve, which adjusts the flow between the working volumes dependent upon a rotational speed of the blade, the flow between the working volumes being substantially adjusted via a first one-way valve comprising a valve housing and a movable cone disposed therein, a variable restriction having a throttle point being disposed between the valve housing and the movable cone, the cone comprising a flow constriction that creates an initial pressure loss between upper and lower cone chambers that are disposed in the cone and that shifts the cone in relation to the valve housing so that the throttle point becomes narrower as the flow velocity increases, wherein the variable restriction between the valve housing and the cone is created by the interaction of a recess formed in the valve housing and a recess formed in the outer face of the valve cone, the position of the recess formed in the valve housing and the recess formed in the outer face of the valve cone in relation to each other is determined by an initial pressure loss over the cone in combination with spring forces created by a spring disposed between the cone and the valve housing, and when the pressure loss over the cone is zero, the position of the recess formed in the valve housing and the recess formed in the outer face of the valve cone in relation to each other is determined by a position of an adjusting wheel.

15. The hydraulic rotation damper as claimed in claim 14 wherein rotation of the adjusting wheel shifts the cone in relation to the valve housing.

16. The hydraulic rotation damper as claimed in claim 14 wherein the flow constriction has the form of an opening in the cone, the opening in the cone having a certain flow area.

17. The hydraulic rotation damper as claimed in claim 16 wherein the opening in the cone is disposed in a wall dividing an interior of the cone into two.

18. The hydraulic rotation damper as claimed in claim 14 wherein the first working volume and the second working volume are connected by a recess.

* * * * *